US012667909B2

(12) United States Patent
Matsuo et al.

(10) Patent No.: US 12,667,909 B2
(45) Date of Patent: Jun. 30, 2026

(54) LASER PROCESSING DEVICE AND EVALUATION METHOD

(71) Applicant: TOYOTA JIDOSHA KABUSHIKI KAISHA, Toyota (JP)

(72) Inventors: Ryuta Matsuo, Nagakute (JP); Takashi Motoyoshi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 744 days.

(21) Appl. No.: 18/177,557

(22) Filed: Mar. 2, 2023

(65) Prior Publication Data

US 2023/0364704 A1 Nov. 16, 2023

(30) Foreign Application Priority Data

May 16, 2022 (JP) ................................. 2022-080083

(51) Int. Cl.
*B23K 26/03* (2006.01)
*B23K 26/70* (2014.01)

(52) U.S. Cl.
CPC ............ *B23K 26/032* (2013.01); *B23K 26/70* (2015.10)

(58) Field of Classification Search
CPC .... B23K 26/032; B23K 26/70; B23K 26/082; B23K 9/095; B23K 9/0956
USPC .................................................... 219/121.85
See application file for complete search history.

(56) References Cited

U.S. PATENT DOCUMENTS

| | | | | | |
|---|---|---|---|---|---|
| 3,778,585 A | * | 12/1973 | Mallozzi | .................. | G21B 1/23 |
| | | | | | 219/121.77 |
| 4,498,917 A | * | 2/1985 | Weinstein | .............. | G01B 11/10 |
| | | | | | 264/1.27 |
| 5,337,148 A | * | 8/1994 | Torii | ........................ | B23K 9/10 |
| | | | | | 356/608 |
| 5,473,136 A | * | 12/1995 | Engelhardt | .......... | B23K 26/032 |
| | | | | | 219/121.62 |

(Continued)

FOREIGN PATENT DOCUMENTS

| | | | | |
|---|---|---|---|---|
| CN | 112643191 A | * | 4/2021 | ............. B23K 26/70 |
| JP | S58-021101 U | | 2/1983 | |

(Continued)

OTHER PUBLICATIONS

Translation of Aug. 8, 2024 Office Action issued in Japanese Patent Application No. 2022-080083.

*Primary Examiner* — Jimmy Chou
(74) *Attorney, Agent, or Firm* — Oliff PLC

(57) ABSTRACT

A laser processing device includes: an oscillator that oscillates laser light; a mirror in which second laser light that is another part of laser light is reflected while first laser light that is a part of laser light is transmitted through the mirror to irradiate a processing target portion with second laser light, and first reflected light that is a part of reflected light in which second laser light is reflected by the processing target portion is transmitted through the mirror; an absorption unit that receives and absorbs the first laser light until an amount of the first laser light becomes equal to or less than a predetermined light amount; a sensor unit that measures intensity of the first reflected light; and a quality evaluation unit that outputs an evaluation result representing the quality of the laser processing at the processing target portion based on a measurement result.

2 Claims, 6 Drawing Sheets

(56) References Cited

U.S. PATENT DOCUMENTS

| | | | | | |
|---|---|---|---|---|---|
| 5,668,628 | A * | 9/1997 | Terawaki | | G01B 11/272 |
| | | | | | 901/3 |
| 5,869,805 | A * | 2/1999 | Beyer | | B23K 26/032 |
| | | | | | 219/121.64 |
| 6,023,044 | A * | 2/2000 | Kosaka | | B23K 9/025 |
| | | | | | 901/42 |
| 6,660,964 | B1 * | 12/2003 | Benderly | | B23K 26/066 |
| | | | | | 219/121.68 |
| 6,670,574 | B1 * | 12/2003 | Bates | | B23K 26/032 |
| | | | | | 219/121.64 |
| 6,700,658 | B2 * | 3/2004 | Leonard | | G01N 21/95684 |
| | | | | | 356/237.1 |
| 6,791,057 | B1 * | 9/2004 | Kratzsch | | B23K 26/24 |
| | | | | | 219/121.62 |
| 7,577,285 | B2 * | 8/2009 | Schwarz | | B23K 9/0956 |
| | | | | | 348/90 |
| 7,989,730 | B2 * | 8/2011 | Regaard | | B23K 26/04 |
| | | | | | 219/121.63 |
| 8,822,875 | B2 * | 9/2014 | Webster | | B23K 26/032 |
| | | | | | 219/121.13 |
| 8,853,590 | B2 * | 10/2014 | Kim | | H10D 86/0229 |
| | | | | | 438/662 |
| 9,517,533 | B2 * | 12/2016 | Uchida | | G01B 11/30 |
| 10,222,337 | B1 * | 3/2019 | Yoo | | H01J 49/105 |
| 10,695,863 | B1 * | 6/2020 | Dietz | | B23K 26/0643 |
| 11,511,370 | B2 * | 11/2022 | Sakurai | | B23K 26/0608 |
| 11,964,339 | B2 * | 4/2024 | Sakai | | B23K 26/0643 |
| 12,053,840 | B2 * | 8/2024 | Regaard | | B23K 31/125 |
| 12,403,548 | B2 * | 9/2025 | Yokoyama | | G01B 9/02091 |
| 2002/0144984 | A1 * | 10/2002 | Mori | | B23K 26/244 |
| | | | | | 219/121.64 |
| 2002/0158053 | A1 * | 10/2002 | Kessler | | B23K 26/034 |
| | | | | | 219/121.83 |
| 2005/0091859 | A1 * | 5/2005 | Pu | | G01C 15/004 |
| | | | | | 33/281 |
| 2006/0011592 | A1 * | 1/2006 | Wang | | B23K 26/034 |
| | | | | | 219/121.64 |
| 2007/0084837 | A1 * | 4/2007 | Kosmowski | | B23K 26/043 |
| | | | | | 219/121.68 |
| 2009/0001063 | A1 * | 1/2009 | Weick | | B23K 26/10 |
| | | | | | 219/121.85 |
| 2010/0133243 | A1 * | 6/2010 | Nomaru | | B23K 26/032 |
| | | | | | 219/121.67 |
| 2011/0284508 | A1 * | 11/2011 | Miura | | B23K 31/125 |
| | | | | | 219/121.64 |
| 2012/0103954 | A1 * | 5/2012 | Yilbas | | B23K 26/38 |
| | | | | | 219/121.72 |
| 2012/0138586 | A1 * | 6/2012 | Webster | | B23K 26/032 |
| | | | | | 219/121.64 |
| 2012/0285936 | A1 * | 11/2012 | Urashima | | G01B 9/02091 |
| | | | | | 219/121.63 |
| 2012/0318775 | A1 * | 12/2012 | Schwarz | | B23K 26/032 |
| | | | | | 356/606 |
| 2013/0001208 | A1 * | 1/2013 | Jurca | | B23K 26/046 |
| | | | | | 219/121.83 |
| 2013/0043225 | A1 * | 2/2013 | Schurmann | | B23K 26/044 |
| | | | | | 219/121.64 |
| 2013/0062324 | A1 * | 3/2013 | Dorsch | | B23K 26/20 |
| | | | | | 219/121.63 |
| 2013/0068738 | A1 * | 3/2013 | Schurmann | | B23K 26/03 |
| | | | | | 219/121.72 |
| 2013/0120740 | A1 * | 5/2013 | Schonleber | | G01B 9/02063 |
| | | | | | 356/72 |
| 2013/0175243 | A1 * | 7/2013 | Wang | | B23K 26/382 |
| | | | | | 219/121.7 |
| 2013/0319980 | A1 * | 12/2013 | Hesse | | B23K 26/032 |
| | | | | | 219/121.62 |
| 2014/0116997 | A1 * | 5/2014 | Inoue | | B23K 26/38 |
| | | | | | 219/121.67 |
| 2014/0138363 | A1 * | 5/2014 | Hammann | | B23K 26/04 |
| | | | | | 219/121.78 |
| 2014/0144895 | A1 * | 5/2014 | Stork Genannt Wersborg | | B23K 26/042 |
| | | | | | 219/121.75 |
| 2014/0293388 | A1 * | 10/2014 | Matsumoto | | G03H 1/0808 |
| | | | | | 359/9 |
| 2014/0307299 | A1 * | 10/2014 | Matsumoto | | B23K 26/064 |
| | | | | | 359/238 |
| 2015/0014286 | A1 * | 1/2015 | Staupendahl | | B23K 26/0626 |
| | | | | | 219/121.61 |
| 2015/0014889 | A1 * | 1/2015 | Goya | | B23K 26/0652 |
| | | | | | 219/121.72 |
| 2015/0224600 | A1 * | 8/2015 | Spiess | | B23K 26/032 |
| | | | | | 219/121.72 |
| 2015/0246413 | A1 * | 9/2015 | Kawakita | | B23K 31/125 |
| | | | | | 219/121.64 |
| 2015/0266132 | A1 * | 9/2015 | Kawakita | | B23K 26/24 |
| | | | | | 219/121.64 |
| 2016/0039045 | A1 * | 2/2016 | Webster | | B23K 26/032 |
| | | | | | 356/450 |
| 2016/0052091 | A1 * | 2/2016 | Uchida | | B23K 26/21 |
| | | | | | 219/121.64 |
| 2016/0059347 | A1 * | 3/2016 | Kogel-Hollacher | | B23K 26/082 |
| | | | | | 219/121.73 |
| 2016/0059350 | A1 * | 3/2016 | Schoenleber | | B23K 26/04 |
| | | | | | 219/121.81 |
| 2016/0067832 | A1 * | 3/2016 | Kobayashi | | B23K 26/032 |
| | | | | | 219/121.64 |
| 2016/0114434 | A1 * | 4/2016 | Regaard | | B23K 26/046 |
| | | | | | 219/121.81 |
| 2016/0138127 | A1 * | 5/2016 | Nomura | | B23K 26/06 |
| | | | | | 219/121.84 |
| 2016/0193692 | A1 * | 7/2016 | Regaard | | B23K 31/125 |
| | | | | | 219/121.62 |
| 2016/0202045 | A1 * | 7/2016 | Schönleber | | B23K 26/046 |
| | | | | | 356/497 |
| 2016/0354867 | A1 * | 12/2016 | Matsuoka | | B23K 26/24 |
| 2016/0356595 | A1 * | 12/2016 | Lessmueller | | B23K 26/044 |
| 2017/0043431 | A1 * | 2/2017 | Kuba | | B23K 26/032 |
| 2017/0095885 | A1 * | 4/2017 | Zhang | | B23K 26/21 |
| 2017/0109874 | A1 * | 4/2017 | Hallasch | | B23K 26/60 |
| 2017/0120337 | A1 * | 5/2017 | Kanko | | B23K 15/0013 |
| 2017/0259373 | A1 * | 9/2017 | Albert | | B23K 31/125 |
| 2017/0282293 | A1 * | 10/2017 | Miyata | | B23K 26/048 |
| 2017/0326669 | A1 * | 11/2017 | Moser | | B23K 15/0013 |
| 2017/0334019 | A1 * | 11/2017 | Izumi | | B23K 26/032 |
| 2018/0076060 | A1 * | 3/2018 | Oh | | B23K 26/032 |
| 2018/0221989 | A1 * | 8/2018 | Matsuoka | | B23K 26/082 |
| 2018/0221990 | A1 * | 8/2018 | Aoki | | G02B 26/10 |
| 2018/0264600 | A1 * | 9/2018 | Sugino | | B23K 26/03 |
| 2018/0372483 | A1 * | 12/2018 | Moser | | G01B 11/22 |
| 2019/0015931 | A1 * | 1/2019 | Kogel-Hollacher | | B23K 26/34 |
| 2019/0041196 | A1 * | 2/2019 | Strebel | | G01B 11/22 |
| 2019/0061062 | A1 * | 2/2019 | Kubo | | B23K 37/0408 |
| 2019/0091798 | A1 * | 3/2019 | Schönleber | | B23K 26/21 |
| 2019/0143458 | A1 * | 5/2019 | Strebel | | B23K 26/032 |
| | | | | | 219/121.64 |
| 2019/0240785 | A1 * | 8/2019 | Magg | | B23K 26/0626 |
| 2019/0299331 | A1 * | 10/2019 | Moser | | B23K 26/064 |
| 2019/0375051 | A1 * | 12/2019 | Regaard | | B23K 26/38 |
| 2020/0041249 | A1 * | 2/2020 | Strebel | | B23K 26/032 |
| 2020/0055141 | A1 * | 2/2020 | Schürmann | | B23K 26/048 |
| 2020/0055142 | A1 * | 2/2020 | Schürmann | | B23K 26/21 |
| 2020/0198049 | A1 * | 6/2020 | Yokoyama | | B23K 31/003 |
| 2020/0198051 | A1 * | 6/2020 | Sauer | | B23K 26/042 |
| 2020/0209523 | A1 * | 7/2020 | Nehashi | | G01B 11/026 |
| 2020/0262004 | A1 * | 8/2020 | Moser | | B23K 26/702 |
| 2020/0361038 | A1 * | 11/2020 | Takechi | | G01B 11/22 |
| 2020/0376591 | A1 * | 12/2020 | Sakai | | B23K 26/064 |
| 2020/0376592 | A1 * | 12/2020 | Sakai | | B23K 26/032 |
| 2020/0406392 | A1 * | 12/2020 | Fukushima | | B23K 26/082 |
| 2021/0010803 | A1 * | 1/2021 | Okuma | | G01C 3/06 |
| 2021/0023656 | A1 * | 1/2021 | Sakai | | B23K 26/244 |
| 2021/0031298 | A1 * | 2/2021 | Sakai | | G01B 11/22 |
| 2021/0053149 | A1 * | 2/2021 | Takechi | | B23K 26/0665 |
| 2021/0060695 | A1 * | 3/2021 | Yokoyama | | B23K 26/21 |
| 2021/0107096 | A1 * | 4/2021 | Funami | | B23K 31/125 |

(56)          References Cited

U.S. PATENT DOCUMENTS

| 2021/0323088 | A1 * | 10/2021 | Yokoyama | ........... | B23K 26/082 |
|---|---|---|---|---|---|
| 2021/0370438 | A1 * | 12/2021 | Fujiwara | ............ | B23K 26/0648 |
| 2021/0402521 | A1 * | 12/2021 | Lin | ...................... | B23K 26/361 |
| 2022/0143745 | A1 * | 5/2022 | Funami | ................ | B23K 31/125 |
| 2022/0161356 | A1 * | 5/2022 | Fujiwara | ................ | B23K 26/10 |
| 2022/0290973 | A1 * | 9/2022 | Stambke | .............. | B23K 26/082 |
| 2022/0324054 | A1 * | 10/2022 | Walde | ................ | B23K 26/0876 |
| 2022/0388098 | A1 * | 12/2022 | Funami | ............... | B23K 26/707 |
| 2023/0120761 | A1 * | 4/2023 | Krause | ................. | G05B 23/024 |
| | | | | | 219/121.83 |

FOREIGN PATENT DOCUMENTS

| JP | H05-050757 | U | | 7/1993 | | |
|---|---|---|---|---|---|---|
| JP | 2694929 | B2 | * | 12/1997 | .......... | B23K 26/382 |
| JP | H11-129082 | A | | 5/1999 | | |
| JP | 2003-245789 | A | | 9/2003 | | |
| JP | 2006247681 | A | * | 9/2006 | ............ | B23K 26/03 |
| JP | 2012-035307 | A | | 2/2012 | | |
| JP | 2021-058927 | A | | 4/2021 | | |

* cited by examiner

LASER PROCESSING DEVICE AND EVALUATION METHOD

CROSS-REFERENCE TO RELATED APPLICATION

This application claims priority to Japanese Patent Application No. 2022-080083 filed on May 16, 2022, incorporated herein by reference in its entirety.

BACKGROUND

1. Technical Field

The present disclosure relates to a laser processing device and an evaluation method.

2. Description of Related Art

As described in Japanese Unexamined Patent Application Publication No. 2021-58927 (JP 2021-58927 A), conventionally, in order to evaluate the welding quality in a laser processing device, a measurement result of the intensity of thermal radiation light emitted from the welding portion to be welded by laser light irradiation has been used.

SUMMARY

In order to accurately measure the intensity of the thermal radiation light, the irradiation range of the laser light needs to be within a sensor visual field, and the focusing diameter of the laser light and the size of the sensor visual field need to be the same. For example, when the sensor visual field is larger than the irradiation range of the laser light, the thermal radiation light generated from the molten pool near the irradiation range of the laser light is also measured. In this case, it is not possible to accurately measure the thermal radiation light in the irradiation range of the laser light, and the evaluation accuracy is lowered. Therefore, in order to maintain the evaluation accuracy, it is essential to accurately match the sensor visual field and the focusing diameter of the laser light, and a laser processing device that can easily maintain the evaluation accuracy has been desired.

The present disclosure can be realized in the following aspects.

(1) According to one aspect of the present disclosure, a laser processing device is provided. This laser processing device is a laser processing device including a function of evaluating quality of laser processing, and includes an oscillator that oscillates laser light; a mirror disposed in an optical path of the laser light, in which second laser light that is another part of the laser light is reflected by the mirror while first laser light that is a part of the laser light emitted from the oscillator is transmitted through the mirror to irradiate a processing target portion with the second laser light, and first reflected light that is a part of reflected light in which the second laser light with which the processing target portion is irradiated is reflected by the processing target portion is transmitted through the mirror; an absorption unit that receives the first laser light and absorbs the first laser light until an amount of the first laser light becomes equal to or less than a predetermined light amount; a sensor unit that measures intensity of the first reflected light transmitted through the mirror; and a quality evaluation unit that outputs an evaluation result representing the quality of the laser processing at the processing target portion based on a measurement result of the intensity of the first reflected light measured by the sensor unit.

According to the above aspect, the first laser light transmitted through the mirror out of the laser light emitted from the oscillator is absorbed until the amount of the first laser light becomes equal to or less than the predetermined light amount, and is not incident on the sensor unit. The quality evaluation unit evaluates the quality of the laser processing at the processing target portion based on the intensity of the first reflected light reflected at the processing target portion. It is not essential to accurately match a sensor visual field and a laser focusing diameter as compared with an aspect in which the quality of the laser processing is evaluated using thermal radiation light, so that it is easy to maintain the evaluation accuracy.

(2) In the laser processing device according to the above aspect, the absorption unit may include a tubular member on which the first laser light is incident and that includes an inner surface to which black anodized treatment is applied, the tubular member including one end that is closed.

According to the above aspect, the first laser light incident on the tubular member of the absorption unit is dampened while being repeatedly reflected. With such a simple configuration, the first laser light transmitted through the mirror can be dampened to the predetermined light amount or less.

(3) According to another aspect of the present disclosure, an evaluation method for evaluating quality of laser processing by a laser processing device is provided. The laser processing device includes: an oscillator that oscillates laser light; a mirror disposed in an optical path of the laser light, in which second laser light that is another part of the laser light is reflected by the mirror while first laser light that is a part of the laser light emitted from the oscillator is transmitted through the mirror to irradiate a processing target portion with the second laser light, and first reflected light that is a part of reflected light in which the second laser light with which the processing target portion is irradiated is reflected by the processing target portion is transmitted through the mirror; an absorption unit that receives the first laser light and absorbs the first laser light until an amount of the first laser light becomes equal to or less than a predetermined light amount; a sensor unit that measures intensity of the first reflected light transmitted through the mirror. The evaluation method causes a computer to execute a step of receiving a measurement result of the intensity of the first reflected light measured by the sensor unit, a step of evaluating the quality of the laser processing at the processing target portion based on the measurement result, and a step of outputting an evaluation result representing the quality.

According to the above aspect, the first laser light transmitted through the mirror out of the laser light emitted from the oscillator is absorbed until the amount of the first laser light becomes equal to or less than the predetermined light amount, and is not incident on the sensor unit. The quality evaluation unit evaluates the quality of the laser processing at the processing target portion based on the intensity of the first reflected light reflected at the processing target portion. It is not essential to accurately match a sensor visual field and a laser focusing diameter as compared with an aspect in which the quality of the laser processing is evaluated using thermal radiation light, so that it is easy to maintain the evaluation accuracy.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. Embodiment

Figure 1:
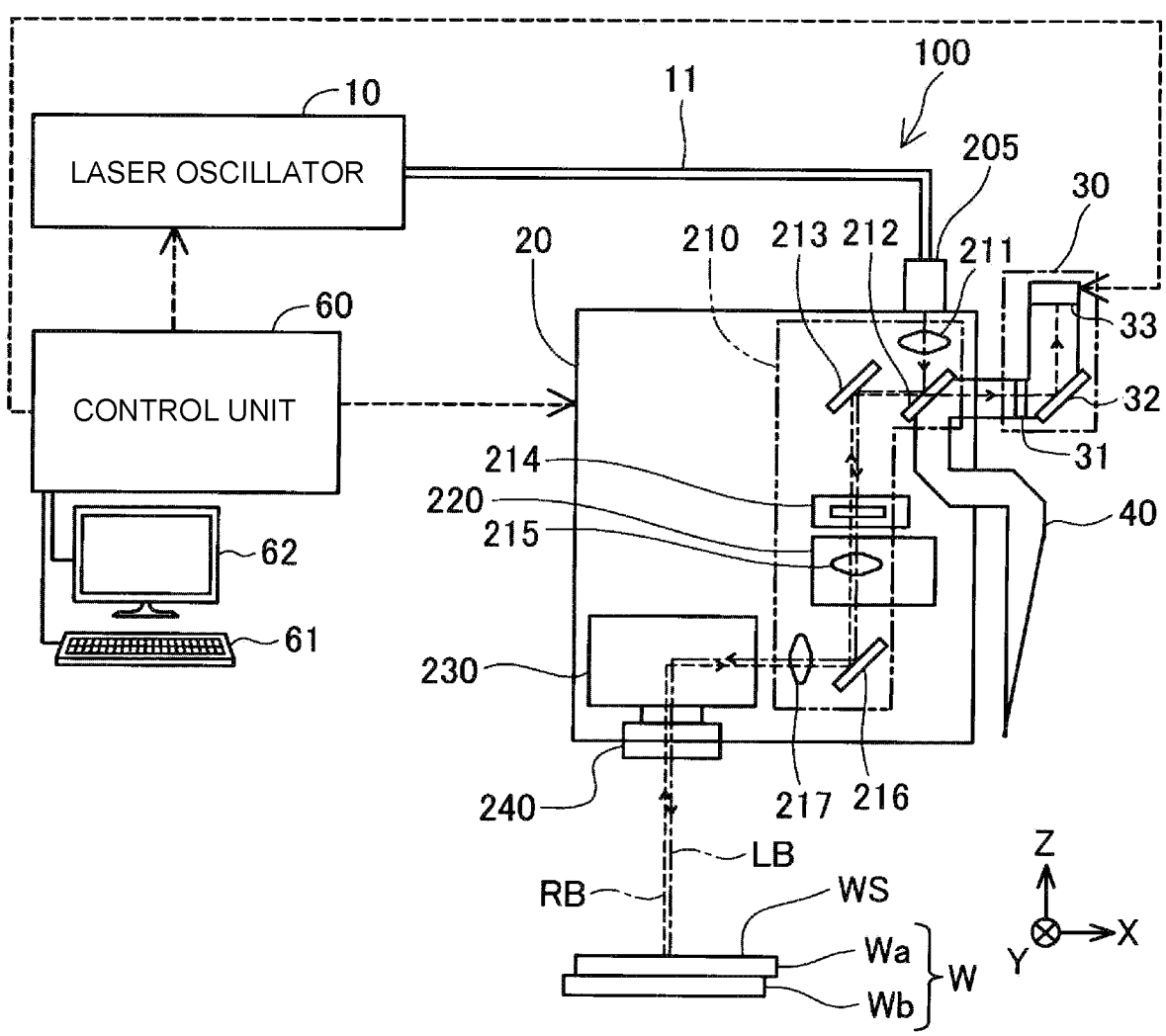
FIG. 1 is a diagram showing a schematic configuration of a laser welding device.

FIG. 1 is a diagram showing a schematic configuration of a laser welding device 100. In FIG. 1, the XYZ Cartesian coordinate system is set to facilitate understanding of the technique. It is assumed that the X axis and the Y axis are along the horizontal plane and the Z axis is along the vertical line. Therefore, the negative Z direction is the direction of gravity. The laser welding device 100 welds a first metal target object Wa and a second metal target object Wb by irradiating the first metal target object Wa and the second metal target object Wb that are overlapped with laser light LB. The first metal target object Wa and the second metal target object Wb are referred to as a workpiece WK. The laser welding device 100 is also referred to as a laser processing device. Further, the laser welding device 100 evaluates the welding quality based on the intensity of the reflected light RB that is the laser light LB reflected by the workpiece WK. In FIG. 1, the optical path of the laser light LB and the optical path of the reflected light RB deviate from each other to facilitate understanding of the technique. The laser welding device 100 includes a laser oscillator 10, an optical fiber cable 11, a laser scanner 20, a measuring unit 30, a damping structure 40, a control unit 60, an input device 61, and a display device 62.

The laser oscillator 10 outputs the laser light LB generated by laser oscillation. The laser oscillator 10 is, for example, a fiber laser. The laser oscillator 10 is connected to the laser scanner 20 via the optical fiber cable 11. The laser oscillator 10 is also referred to as an oscillator.

The workpiece WK to be processed is irradiated with the laser light LB output from the laser oscillator 10 by the laser scanner 20. The laser scanner 20 is attached to the tip of a robot arm (not shown). The laser scanner 20 is moved to a target welding position of the workpiece WK by the robot arm. A robot controller (not shown) drives the joints of the robot arm, so that the robot arm can move the laser scanner 20 to a specified position and arrange the laser scanner 20 in a specified direction. The laser scanner 20 includes an optical isolator 205, an optical system 210, a Z lens drive unit 220, a galvanometer scanner unit 230, and a protective glass 240.

The optical isolator 205 allows the laser light LB emitted from the end surface of the optical fiber cable 11 to pass therethrough and suppresses the reflected light RB from entering the laser oscillator 10. The optical isolator 205 is connected to the laser oscillator 10 via the optical fiber cable 11.

The optical system 210 guides the laser light LB so as to follow a determined optical path. The optical system 210 includes a collimating lens 211, a dichroic mirror 212, a first reflecting mirror 213, a diffractive optical element (DOE) 214, a Z lens 215, a second reflecting mirror 216, and a condensing lens 217. The collimating lens 211 is a lens for correcting the laser light LB to parallel light.

The dichroic mirror 212 is a mirror by which the light in a specific wavelength region is reflected and through which the light in other wavelength regions is transmitted. The dichroic mirror 212 is also referred to as a mirror. In the embodiment, the dichroic mirror 212 is a mirror by which the light in a predetermined wavelength region centered on the center wavelength of the laser light LB output from the laser oscillator 10 is reflected, and through which the light in other wavelength regions is transmitted. The wavelength region in which the light is reflected by the dichroic mirror 212 is referred to as a reflection wavelength region. In the embodiment, the reflection wavelength region is a wavelength region within a predetermined range centered on the center wavelength of the laser light LB. The center wavelength of the laser light LB is, for example, 1070 nm. However, the light in the reflection wavelength region cannot completely be reflected by the dichroic mirror 212. For example, the dichroic mirror 212 has a reflectance of 99.9% in the reflection wavelength region and a transmittance of 0.1% in the reflection wavelength region. In other words, 0.1% of the light in the specific wavelength region incident on the dichroic mirror 212 is transmitted through the dichroic mirror 212. The laser light LB in a part of the reflection wavelength region that is transmitted through the dichroic mirror 212 is also referred to as first laser light. The laser light LB in a part of the reflection wavelength region that is reflected by the dichroic mirror 212 is also referred to as second laser light.

The first reflecting mirror 213 and the second reflecting mirror 216 are total reflecting mirrors. The diffractive optical element 214 is an optical element for adjusting the shape of the laser light LB.

The Z lens drive unit 220 moves the Z lens 215 for changing the focal position of the laser light LB. The Z lens drive unit 220 includes a moving mechanism for moving the position of the Z lens 215 in the optical axis direction, and a driver for driving the moving mechanism.

The galvanometer scanner unit 230 changes the focusing point of the laser light LB by changing the angle of a built-in reflecting mirror. The galvanometer scanner unit 230 includes a reflecting mirror by which the laser light LB is reflected, an angle changing mechanism that changes the angle of the reflecting mirror, and a driver that drives the angle changing mechanism. The galvanometer scanner unit 230 changes the focusing point of the laser light LB, so that the irradiation position of the laser light LB on the workpiece WK is changed.

The protective glass 240 is a lens provided at the output port of the laser light LB in the laser scanner 20 in order to protect the optical system 210 provided in the laser scanner 20.

The laser light LB emitted from the laser oscillator 10 travels along the following optical path in the laser scanner 20. The laser light LB emitted from the laser oscillator 10 enters the laser scanner 20 via the optical fiber cable 11. The laser light LB that has passed through the optical isolator 205 is corrected to the parallel light by the collimating lens 211. The laser light LB is reflected by the dichroic mirror 212 and the first reflecting mirror 213, and is incident on the diffractive optical element 214. The diffractive optical element 214 radiates the incident laser light LB as laser light LB having a power density distribution shape different from that when the laser light LB is incident. The radiated laser light LB passes through the Z lens 215 whose optical axis position is adjusted by the Z lens drive unit 220. After that, the laser light LB is reflected by the second reflecting mirror 216, passes through the condensing lens 217, and is incident on the galvanometer scanner unit 230. The galvanometer scanner unit 230 adjusts the focusing point of the laser light LB. The laser light LB emitted from the galvanometer scanner unit 230 passes through the protective glass 240 and the workpiece WK is irradiated with the laser light LB. When the workpiece WK is irradiated with the laser light LB, the metal is melted to form a molten pool.

Further, the reflected light RB in which the laser light LB with which the workpiece WK is irradiated is reflected travels along the following optical path in the laser scanner 20. The reflected light RB is also referred to as first reflected light. The reflected light RB passes through the protective glass 240 and enters the laser scanner 20. The reflected light RB passes through the galvanometer scanner unit 230 and the condensing lens 217, and is reflected by the second reflecting mirror 216. After that, the reflected light RB passes through the Z lens 215 and the diffractive optical element 214, and is reflected by the first reflecting mirror 213.

Then, a part of the reflected light RB is reflected by the dichroic mirror 212, and another part of the reflected light RB is transmitted through the dichroic mirror 212. Since the reflected light RB has the same wavelength as the laser light LB, 99.9% of the reflected light RB incident on the dichroic mirror 212 is reflected by the dichroic mirror 212. 0.1% of the reflected light RB incident on the dichroic mirror 212 is transmitted through the dichroic mirror 212.

A part of the reflected light RB reflected by the dichroic mirror 212 travels in the positive Z direction, passes through the collimating lens 211, and travels toward the optical isolator 205. The travel of the reflected light RB is blocked by the optical isolator 205. Therefore, the reflected light RB does not enter the laser oscillator 10. In FIG. 1, the optical path of the reflected light RB directed from the dichroic mirror 212 to the optical isolator 205 is not shown. The other part of the reflected light RB transmitted through the dichroic mirror 212 travels in the positive X direction and enters the measuring unit 30.

The measuring unit 30 measures the intensity of the reflected light RB of the laser light LB with which the workpiece WK is irradiated. The measuring unit 30 is also referred to as a sensor unit. The measuring unit 30 includes a bandpass filter 31, a third reflecting mirror 32, and a photoelectric element 33. Only the light in the wavelength region within the predetermined range centered on the specified center wavelength is transmitted by the bandpass filter 31. In the embodiment, only the light in the wavelength region within the predetermined range centered on the center wavelength of the laser light LB emitted by the laser oscillator 10 is transmitted by the bandpass filter 31. The third reflecting mirror 32 reflects the reflected light RB incident on the measuring unit 30 and causes the reflected light RB to travel toward the photoelectric element 33. The third reflecting mirror 32 is a total reflecting mirror. The photoelectric element 33 is used for measuring the intensity of the reflected light RB. Specifically, the photoelectric element 33 converts the incident reflected light RB into an electrical signal, and outputs the electrical signal indicating the intensity of the reflected light RB to the control unit 60. The photoelectric element 33 is, for example, a photodiode or a phototransistor.

The damping structure 40 receives a part of the laser light LB in the reflection wavelength region that has passed through the dichroic mirror 212, and absorbs the part of the laser light LB until the light amount is equal to or less than a predetermined light amount. The damping structure 40 is also referred to as an absorption unit.

Figure 2:
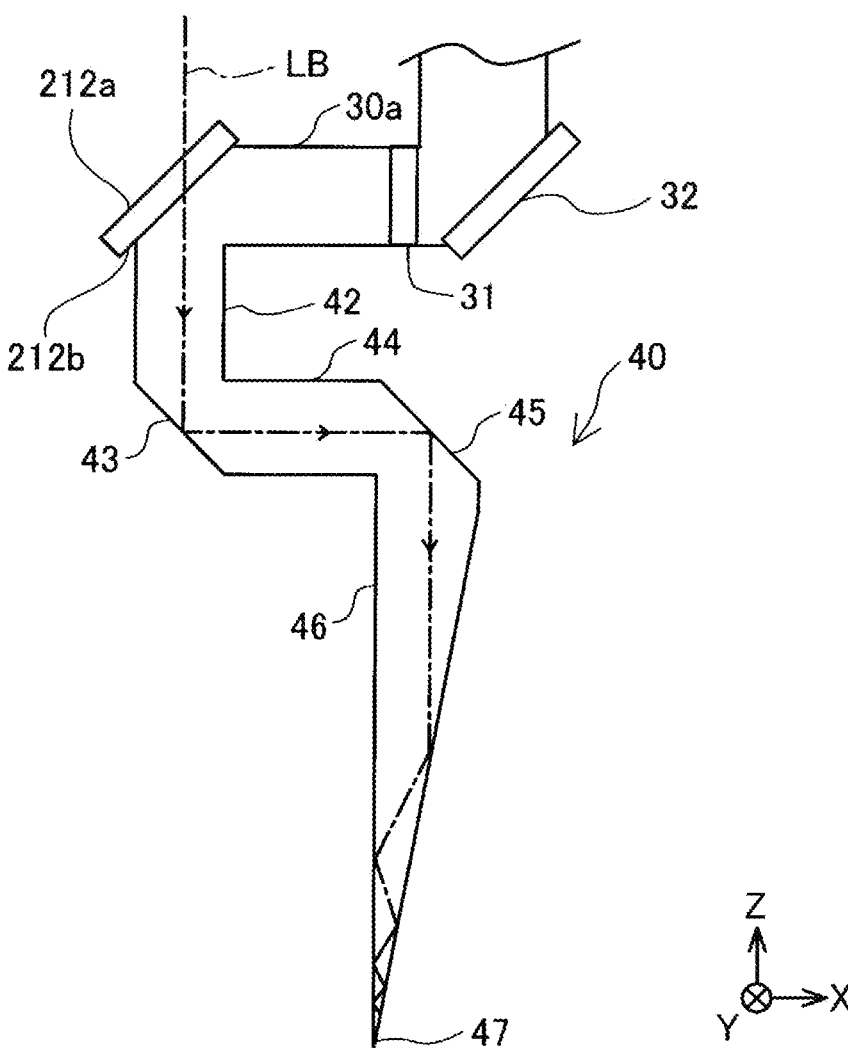
FIG. 2 is a diagram showing a schematic configuration of a damping structure.

FIG. 2 is a diagram showing a schematic configuration of the damping structure 40. The damping structure 40 is a member that is formed in a tubular shape and that has one end that is open. The damping structure 40 is made of aluminum, for example. The damping structure 40 includes a first straight portion 42, a first bending portion 43, a second straight portion 44, a second bending portion 45, a third straight portion 46, and a terminal end portion 47. The first straight portion 42 is a passage extending along the Z-axis direction. The end of the first straight portion 42 on the positive Z side is open.

A surface 212b of the dichroic mirror 212 opposite to a surface 212a on which the laser light LB is incident is disposed at an angle of 45 degrees with respect to the open end of the first straight portion 42 on the positive Z side. Further, the surface 212b of the dichroic mirror 212 is disposed at an angle of 45 degrees with respect to the open end of a tubular member 30a of the measuring unit 30. Thus, at least a part of the light transmitted through the dichroic mirror 212 in the negative Z direction enters the damping structure 40. Further, at least a part of the light transmitted through the dichroic mirror 212 in the positive X direction enters the measuring unit 30.

The first bending portion 43 connects the first straight portion 42 and the second straight portion 44. The second straight portion 44 is a passage extending along the X-axis direction. The second bending portion 45 connects the second straight portion 44 and the third straight portion 46. The third straight portion 46 is a passage extending along the Z-axis direction. The third straight portion 46 includes a tapered portion that tapers toward the terminal end portion 47. For example, the third straight portion 46 is formed in the shape of a triangular pyramid. The terminal end portion 47 is located on the negative Z side of the third straight portion 46 and is a closed end.

A black anodized treatment is applied to the inner surface of the damping structure 40. The anodized treatment is a surface treatment in which an oxide film is generated on the surface of aluminum. The black anodized treatment is a treatment in which the oxide film is changed to black with a black dye after the anodized treatment.

A part of the laser light LB incident on the surface 212a of the dichroic mirror 212 passes through the dichroic mirror 212, travels in the negative Z direction, and enters the inside of the damping structure 40. The laser light LB travels toward the terminal end portion 47 of the damping structure 40 while being repeatedly reflected by the inner surface of the damping structure 40. The laser light LB incident on the inside of the damping structure 40 is absorbed by the inner surface to which the black anodized treatment is applied every time the laser light LB is repeatedly reflected inside thereof. For example, it is assumed that the reflectance of the inner surface to which thee black anodized treatment is applied is approximately 40%. In this case, the light amount of the laser light LB is reduced by approximately 60% by reflection at one time. The light amount of the laser light LB is further reduced by reflection at two times or more. With such a simple configuration, the laser light LB transmitted through the dichroic mirror 212 in the negative Z direction can be absorbed. Therefore, it is possible to suppress the laser light LB emitted by the laser oscillator 10 and transmitted through the dichroic mirror 212 by traveling in the negative Z direction from being incident on the photoelectric element 33 of the measuring unit 30.

Further, the third straight portion 46 is formed so as to gradually taper toward the terminal end portion 47. Therefore, the frequency of reflection of the laser light LB increases toward the terminal end portion 47. As a result, the laser light LB can be efficiently dampened.

Originally, it is desirable that the laser light LB be absorbed until the light amount of the laser light LB entering the damping structure 40 becomes zero, but the light amount of the laser light LB may not be reduced to zero. In this case, it is also assumed that a part of the laser light LB goes out of the damping structure 40 again. Therefore, the shape and the size of the internal space of the damping structure 40 are set such that the laser light LB can be absorbed until the light amount of the laser light LB becomes equal to or less than the predetermined light amount. The predetermined light amount is a light amount that does not affect the measurement of the reflected light RB even when the dampened laser light LB goes out of the damping structure 40, for example.

As described above, the damping structure 40 absorbs the laser light LB transmitted through the dichroic mirror 212 out of the laser light LB incident on the laser scanner 20 from the laser oscillator 10 until the light amount of the laser light LB becomes equal to or less than the predetermined light amount.

Figure 3:
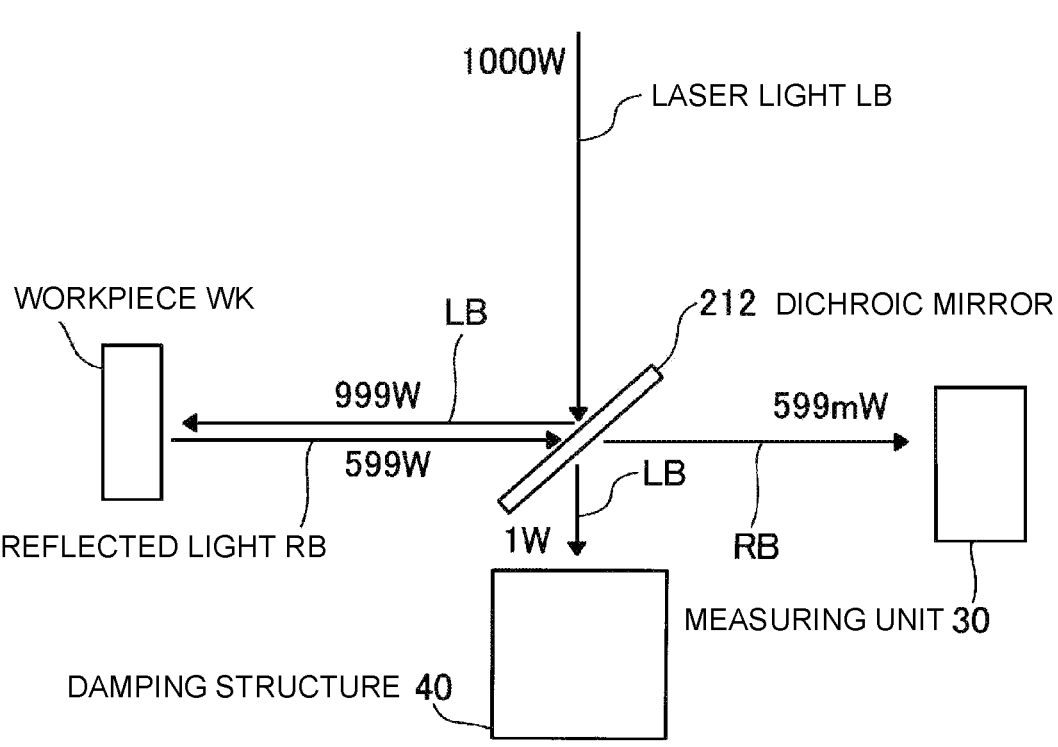
FIG. 3 is a schematic diagram showing a course of reflected light until the reflected light reaches a measuring unit in the laser processing device including the damping structure.

FIG. 3 is a schematic diagram showing a course of the reflected light RB until the reflected light RB reaches the measuring unit 30 in the laser welding device 100 including the damping structure 40. It is assumed that the dichroic mirror 212 has a reflectance of 99.9% in the reflection wavelength region and a transmittance of 0.1% in the reflection wavelength region. The reflectance on the workpiece WK is assumed to be 60%. The reflectance on the damping structure 40 is assumed to be 0%. In FIG. 3, the intensity of the laser light LB is shown to facilitate understanding of the technique. The intensity of the laser light LB is proportional to the light amount of the laser light LB.

In FIG. 3, it is assumed that the power of the laser light LB output from the laser oscillator 10 is 1000 W. 99.9% of the laser light LB of 1000 W, that is, the laser light LB of 999 W, is reflected by the dichroic mirror 212 and is incident on the workpiece WK. 0.1% of the laser light LB of 1000 W, that is, the laser light LB of 1 W, is incident on the damping structure 40 and is absorbed.

The laser light LB of 999 W is reflected by the workpiece WK and becomes the reflected light RB. At this time, the power of the reflected light RB is approximately 599 W. 0.1% of the reflected light RB of 599 W, that is, the reflected light RB of 599 mW, is incident on the measuring unit 30. As described above, since the damping structure 40 absorbs the laser light LB of 1 W, only the reflected light RB transmitted through the dichroic mirror 212 out of the reflected light RB reflected by the workpiece WK is incident on the measuring unit 30. In other words, nothing other than the reflected light RB reflected by the workpiece WK is incident on the measuring unit 30. As described above, a part of the laser light LB transmitted through the dichroic mirror 212 is suppressed from being incident on the photoelectric element 33 of the measuring unit 30. Therefore, the measuring unit 30 can measure only the intensity of the reflected light RB reflected by the processing target portion.

As shown in FIG. 3, the direction in which the laser light LB emitted by the laser oscillator 10 is incident on the dichroic mirror 212 must be different from the direction in which the reflected light RB reflected by the workpiece WK is incident on the dichroic mirror 212. The positions of the laser oscillator 10, the dichroic mirror 212, the workpiece WK, and the measuring unit 30 need to be set such that these directions are different. For example, it is desirable that the direction in which the laser light LB emitted by the laser oscillator 10 is incident on the dichroic mirror 212 and the direction in which the reflected light RB reflected by the workpiece WK is incident on the dichroic mirror 212 be set to be orthogonal. Here, "orthogonal" shall include the range of 90 degree angle plus or minus 10 degrees.

Figure 4:
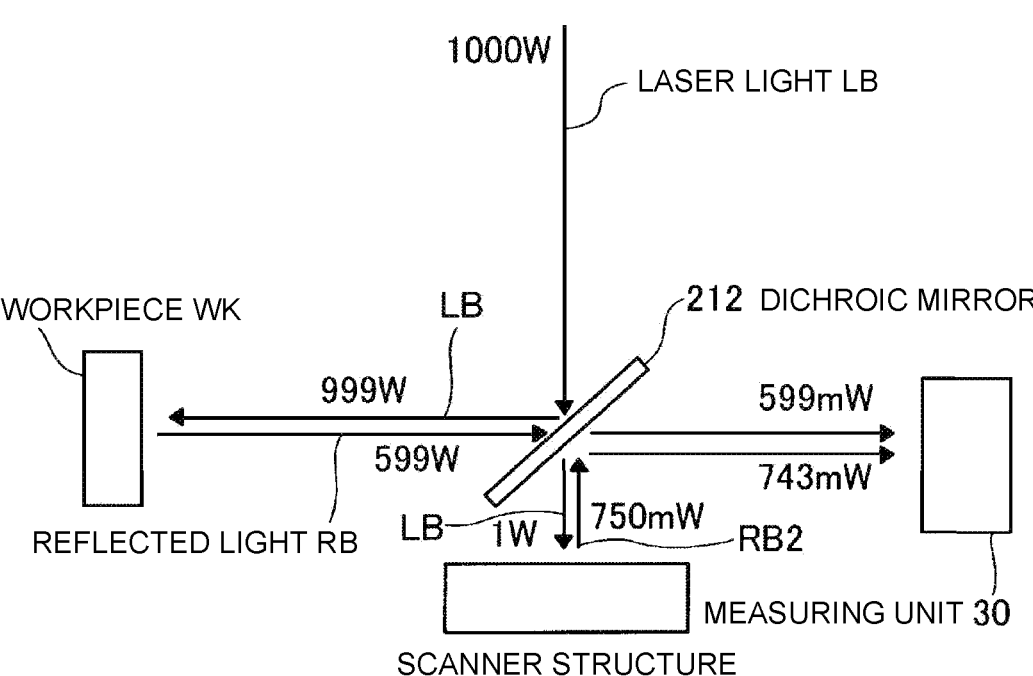
FIG. 4 is a schematic diagram showing a course of reflected light until the reflected light reaches the measuring unit in the laser processing device that does not include the damping structure.

FIG. 4 is a schematic diagram showing a course of the reflected light RB until the reflected light RB reaches the measuring unit 30 in the laser welding device that does not include the damping structure 40. Hereinafter, a case where the damping structure 40 is not provided is described below for comparison. The description of the conditions common to those in FIG. 3 is omitted. A scanner structure is, for example, a part of the housing of the laser scanner 20. The reflectance of the scanner structure is assumed to be 75%.

In FIG. 4, it is assumed that the power of the laser light LB output from the laser oscillator 10 is 1000 W. 99.9% of the laser light LB of 1000 W, that is, the laser light LB of 999 W, is reflected by the dichroic mirror 212 and is incident on the workpiece WK. 0.1% of the laser light LB of 1000 W, that is, the laser light LB of 1 W, is incident on the scanner structure. The laser light LB of 1 W is reflected by the scanner structure and becomes the reflected light RB2. At this time, the power of the reflected light RB2 is approximately 750 mW. The reflected light RB2 of 750 W is reflected by dichroic mirror 212. As a result, the reflected light RB2 of approximately 743 mW is incident on the measuring unit 30.

Further, the laser light LB of 999 W incident on the workpiece WK is reflected by the workpiece WK, and becomes the reflected light RB. At this time, the power of the reflected light RB is approximately 599 W. 0.1% of the reflected light RB of 599 W, that is, the reflected light RB of 599 mW, is incident on the measuring unit 30. As a result, the light of 1342 mW in total is incident on the measuring unit 30.

As described above, in the example shown in FIG. 4, not only the reflected light RB reflected by the workpiece WK but also the reflected light RB2 that is the light transmitted through the dichroic mirror 212 and reflected by the scanner structure out of the laser light LB output from the laser oscillator 10 are incident on the measuring unit 30. Therefore, the light incident on the measuring unit 30 includes the light that is not reflected by the workpiece WK. The reflected light RB and the reflected light RB2 are each the reflected laser light LB, and therefore have the same wavelength. Therefore, the measuring unit 30 cannot measure the reflected light RB and the reflected light RB2 separately.

As shown in FIG. 1, the control unit 60 controls the laser oscillator 10 and the laser scanner 20. The functions of the control unit 60 are realized by a computer including a central processing unit (CPU) and a memory. The memory stores a program for executing a laser welding process. This program is executed by the CPU. Accordingly, the laser oscillator 10 and the laser scanner 20 are controlled. Specifically, the control unit 60 specifies the output value of the laser light LB, and causes the laser oscillator 10 to output the laser light LB. The control unit 60 specifies the irradiation position of the laser light LB on the surface to be irradiated of the workpiece WK by the XY coordinates, and causes the galvanometer scanner unit 230 to change the focusing point of the laser light LB. In addition, the control unit 60 specifies the focal position, and causes the Z lens drive unit 220 to move the Z lens 215.

Further, the control unit 60 receives the electrical signal indicating the intensity of the reflected light RB from the measuring unit 30. For example, the control unit 60 monitors time-series changes in the intensity of the reflected light RB based on time-series changes in the output current of the photoelectric element 33. The control unit 60 evaluates the welding quality based on the time-series changes in the intensity of the reflected light RB. The control unit 60 is also referred to as a quality evaluation unit.

The input device 61 is a keyboard, mouse, etc. connected to the control unit 60. The input device 61 is used, for example, by a user to input the output value of the laser light LB. The display device 62 is a liquid crystal display, an organic electroluminescence (EL) display, etc. connected to the control unit 60. The display device 62 is used, for example, to display an evaluation result.

Figure 5:
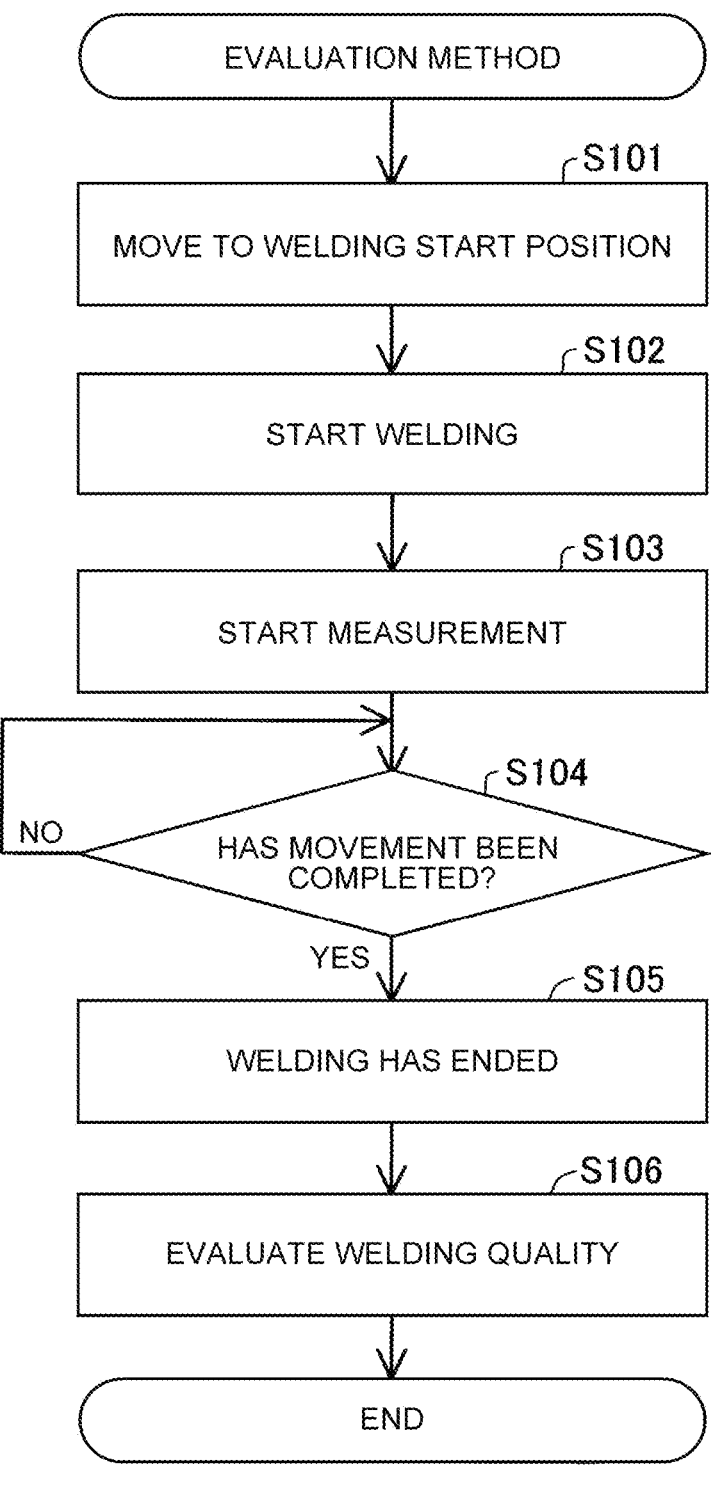
FIG. 5 is a flowchart showing an evaluation method for evaluating welding quality by the laser welding device.

FIG. 5 is a flowchart showing an evaluation method for evaluating the welding quality by the laser welding device 100. In step S101, the control unit 60 instructs the robot controller to move the robot arm to a welding start position. In response to the instruction from the control unit 60, the robot controller moves the robot arm to the welding start position. Therefore, the laser scanner 20 attached to the tip of the robot arm is arranged at the welding start position. The robot controller notifies the control unit 60 that the movement of the robot arm to the welding start position has been completed.

In step S102, the control unit 60 starts welding in response to the notification from the robot controller. Specifically, the control unit 60 controls the laser oscillator 10 to start outputting the laser light LB. Further, the control unit 60 instructs the robot controller to cause the robot arm to execute a movement operation. The movement operation executed by the robot arm means moving the laser scanner 20 by the movement of the robot arm along a route taught in advance. In response to the instruction for executing the movement operation from the control unit 60, the robot controller starts movement of the robot arm. As the robot arm moves, the workpiece WK is irradiated with the laser light LB from the laser scanner 20.

The control unit 60 controls the laser oscillator 10 as follows, for example, during the time when the output of the laser light LB is started and stopped. The control unit 60 controls the laser oscillator 10 to gradually increase the laser output until the laser output reaches a predetermined output value. When the laser output reaches the predetermined output value, the control unit 60 controls the laser oscillator 10 to keep the laser output constant. After the predetermined period has elapsed, the control unit 60 controls the laser oscillator 10 to gradually reduce the laser output. Therefore, the laser output of the laser oscillator 10 finally becomes zero, that is, the laser output stops. The predetermined period is, for example, a period set such that the timing of stopping the laser output coincides with the timing of completing the operation of the robot arm. The laser output is controlled as described above, so that it is possible to reduce the occurrence of welding defects such as spatter and cracks.

In step S103, the control unit 60 starts measuring the reflected light RB. For example, the control unit 60 acquires the electrical signal indicating the intensity of the reflected light RB output by the photoelectric element 33 every second, and stores the intensity of the reflected light RB indicated by the acquired electrical signal in the memory. That is, the step of receiving the measurement result of the intensity of the reflected light RB measured by the measuring unit 30 is executed by the control unit 60.

In step S104, the control unit 60 waits for the notification that the movement of the robot arm has been completed. Until the movement of the robot arm is completed (step S104; NO), the irradiation of the laser light LB and the measurement of the intensity of the reflected light RB are continued. When the robot controller moves the robot arm to a final point of the route taught in advance, the robot controller notifies the control unit 60 of the completion of the movement. Upon receiving the notification from the robot controller that the movement of the robot arm has been completed (step S104; YES), the control unit 60 executes the process of step S105.

In step S105, the control unit 60 causes the laser oscillator 10 to stop outputting the laser light LB in order to end the welding. Further, the control unit 60 stops acquiring the signal from the photoelectric element 33. After that, the control unit 60 instructs the robot controller to retract the robot arm. In response to the instruction from the control unit 60, the robot controller retracts the robot arm from the final point to the retracted position.

In step S106, the control unit 60 evaluates the welding quality at the processing target portion based on the measured value of the intensity of the reflected light RB, and outputs an image representing the evaluation result to the display device 62. For example, the control unit 60 can evaluate the welding quality as follows. In general, the intensity of the reflected light RB that is the laser light LB reflected by the workpiece WK tends to increase sharply immediately after the start of the irradiation of the laser light LB, decrease sharply, and then take a substantially constant value. The control unit 60 evaluates that the welding defects occur when the intensity of the reflected light RB is out of the predetermined range after a predetermined time has elapsed since the start of the irradiation. Specifically, it is assumed that an upper limit value and a lower limit value that define the determined range are stored in advance in the memory. When the intensity of the reflected light RB exceeds the upper limit value or falls below the lower limit value, the control unit 60 can evaluate that the welding defects occur. The control unit 60 can output the evaluation result indicating that the welding result is unsatisfactory.

Alternatively, the control unit 60 may evaluate that the welding defects occur when the number of times the intensity of the reflected light RB is out of the predetermined range exceeds a threshold value after the predetermined time has elapsed since the start of the irradiation. That is, the control unit 60 executes, based on the measurement result, the step of evaluating the quality of the laser processing at the processing target portion, and the evaluation step of indicating the evaluation result indicating the quality. As described above, the control unit 60 may output the quality result based on the result of detecting only the reflected light RB in which the laser light LB emitted from the laser oscillator 10 is reflected. Therefore, a complicated process for quality evaluation is not required.

As described above, in the embodiment, the welding quality is evaluated based on the intensity of the reflected light RB that is the laser light LB reflected by the workpiece WK. The advantages of evaluating the welding quality based on the intensity of reflected light RB are described below.

Figure 6:
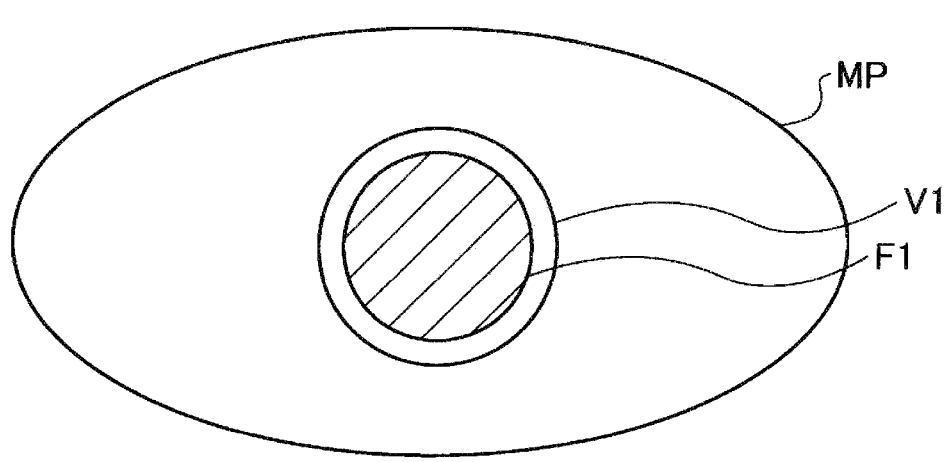
FIG. 6 is a diagram showing an example of a positional relationship between a laser focusing diameter and a sensor visual field.

As conventionally, when the intensity of the thermal radiation light was measured, it was necessary to substantially match the sensor visual field for measuring the thermal radiation light and the focusing diameter of the laser light. The wavelength of the thermal radiation light is, for example, 800 nm. FIG. 6 is a diagram showing an example of a positional relationship between a sensor visual field V1 and a laser focusing diameter F1. In FIG. 6, the size of the sensor visual field V1 and the size of the laser focusing diameter F1 that is the range where the laser light LB is focused, are substantially the same. There is a molten pool MP formed by melting metal around the laser focusing diameter F1.

Figure 7:
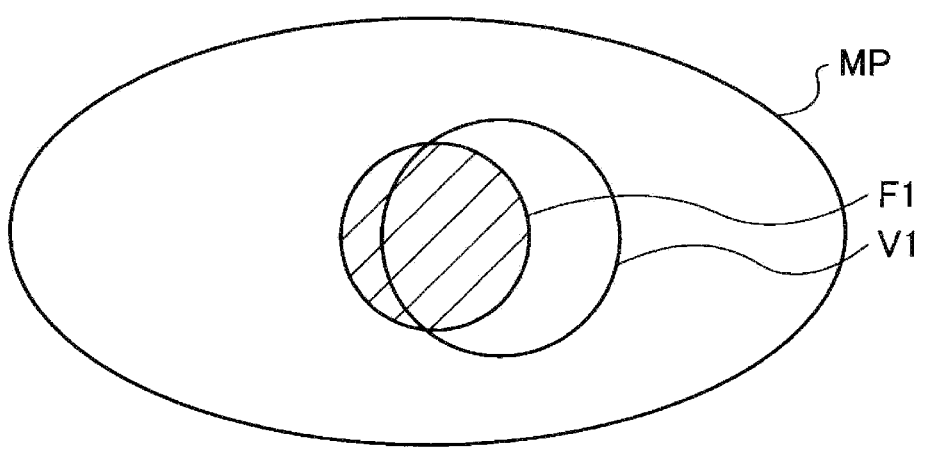
FIG. 7 is a diagram showing another example of a positional relationship between a laser focusing diameter and a sensor visual field.

FIG. 7 is a diagram showing another example of a positional relationship between a sensor visual field V1 and a laser focusing diameter F1. In FIG. 7, a part of the laser focusing diameter F1 is out of the sensor visual field V1. In this case, the sensor cannot accurately measure the intensity of thermal radiation light generated in a partial range of the laser focusing diameter F1. The deviation between the sensor visual field V1 and the laser focusing diameter F1 may occur, for example, as follows. As described above, the welding operation is performed while the laser scanner 20 is moved by the robot arm. For example, it is assumed that a large number of workpieces WK are welded in succession. In such a case, the optical axis or the sensor visual field V1 may deviate due to residual vibration of the robot arm. As a result, the sensor visual field V1 and the laser focusing diameter F1 deviate from each other. Assuming that the sensor visual field V1 and the laser focusing diameter F1 deviate from each other, for example, it is considered that the sensor visual field V1 is set to be larger than the size of the laser focusing diameter F1 to some extent.

Figure 8:
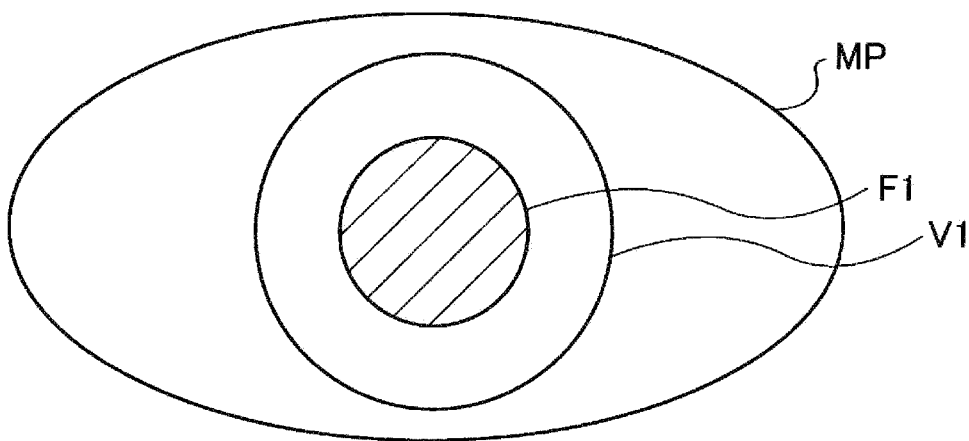
FIG. 8 is a diagram showing still another example of a positional relationship between a laser focusing diameter and a sensor visual field.

FIG. 8 is a diagram showing still another example of a positional relationship between a sensor visual field V1 and a laser focusing diameter F1. FIG. 8 shows an example in which the sensor visual field V1 is set to be larger than the size of the laser focusing diameter F1 to some extent. In this case, it is considered that a situation in which the laser focusing diameter F1 and the sensor visual field V1 deviate from each other is easily suppressed due to the deviation of the optical axis or the sensor visual field. However, in the case shown in FIG. 8, the sensor visual field V1 includes the laser focusing diameter F1 and a part of the molten pool MP. Therefore, in addition to the intensity of the thermal radiation light generated at the laser focusing diameter F1, the intensity of the thermal radiation light generated in the partial range of the molten pool MP is also measured. Therefore, it is impossible to accurately measure the intensity of the thermal radiation light generated at the laser focusing diameter F1. As described above, when the welding quality is evaluated based on the intensity of the thermal radiation light, the above problems may occur.

On the other hand, the reflected light RB is light reflected from the range where the workpiece WK is irradiated with the laser light LB, so that the thermal radiation light is not detected outside the range of the laser focusing diameter F1. For example, even when the sensor visual field V1 is set to be larger than the laser focusing diameter F1 to some extent as shown in FIG. 8, and the size of the sensor visual field V1 and the size of the laser focusing diameter F1 are matched as shown in FIG. 6, a large difference does not occur in the detection result of the reflected light RB. Therefore, even when the sensor visual field V1 is set to be larger than the laser focusing diameter F1 to some extent assuming the deviation of the optical axis or the sensor visual field V1, the accuracy of the evaluation of the welding is not deteriorated as compared with a case where the sensor visual field V1 and the laser focusing diameter F1 are matched.

In the configuration according to the embodiment, the laser light LB transmitted through the dichroic mirror 212 out of the laser light LB emitted from the laser oscillator 10 is absorbed until the amount of the laser light LB becomes equal to or less than the predetermined light amount. It is possible to suppress the laser light LB transmitted through the dichroic mirror 212 out of the laser light LB emitted from the laser oscillator 10 from being incident on the measuring unit 30. As described above, in the laser welding device 100, the quality of the laser processing at the processing target portion is evaluated based on the reflected light RB reflected by the processing target portion. Unlike the conventional evaluation of the quality of the laser processing using the thermal radiation light, it is not essential to accurately match the sensor visual field and the focusing diameter of the laser light LB, so that it is easy to maintain the evaluation accuracy. Further, a method for evaluating the quality of the laser processing using the laser welding device 100 also has the same effect.

In addition, the intensity of the thermal radiation light corresponds to a physical quantity that expresses the shape of the surface of the processing target portion as the heat amount. The intensity of the reflected light RB corresponds to a physical quantity that expresses the shape of the surface of the processing target portion as reflection of the light. From this, it can be said that the shape of the surface of the processing target portion can be expressed more directly using the intensity of the reflected light RB than using the intensity of the thermal radiation light. Therefore, the change in the shape of the surface of the processing target portion is expressed more accurately when the processing target portion is evaluated based on the change in the intensity of the reflected light RB than when the processing target portion is evaluated based on the change in the intensity of the thermal radiation light.

In the embodiment, the welding quality is evaluated using the reflected light RB having the same wavelength as the wavelength of the laser light LB, so that as described above, the part of the laser light LB transmitted through the dichroic mirror 212 may be incident on the photoelectric element 33 of the measuring unit 30. However, since the part of the laser light LB transmitted through the dichroic mirror 212 is absorbed by the damping structure 40, the part of the laser light LB transmitted through the dichroic mirror 212 is suppressed from being incident on the photoelectric element 33 of the measuring unit 30. Therefore, the control unit 60 can evaluate the welding quality at the processing target portion based on the reflected light RB reflected by the processing target portion.

B1. Another Embodiment 1

In the embodiment, the example in which the black anodized treatment is applied to the inner surface of the damping structure 40 has been described, but the present disclosure is not limited to this. For example, a black plating treatment may be applied to the inner surface of the damping structure 40.

In the embodiment, the example in which the laser oscillator 10 is a fiber laser has been described, but the laser oscillator 10 may be another laser such as a Yttrium Aluminum Garnet (YAG) laser.

In the embodiment, the welding has been described as an example of the laser processing, but the above-described evaluation method can also be employed in the laser processing of other modes.

In the embodiment, the damping structure 40 is composed of the tubular member with two bending portions in order to locate the damping structure 40 outside the housing of the laser scanner 20 (see FIG. 2). Alternatively, the damping structure 40 may be composed of a tubular member without bending portions. Further, alternatively, the damping structure 40 may be composed of a tubular member with one bending portion. Alternatively, the damping structure 40 may be composed of a tubular member with three or more bending portions. Further, the damping structure 40 may also be located inside the housing of the laser scanner 20.

In the embodiment, the example in which the third straight portion 46 (see FIG. 2) of the damping structure 40 is formed in the shape of the triangular pyramid has been described. Alternatively, the shape of the third straight portion 46 may be a cone or a quadrangular pyramid. As described above, it is desirable that the third straight portion 46 be formed in a tapered shape so as to gradually taper toward the terminal end portion 47. In this case as well, as in the embodiment, the frequency of the reflection of the laser light LB within the damping structure 40 increases toward the terminal end portion 47. As a result, the laser light LB can be efficiently dampened.

Alternatively, the third straight portion 46 of the damping structure 40 may be formed in the shape of a cylinder or a square prism. In this case, the same effect as in the embodiment can be expected by setting the height of the cylinder or the square prism such that the amount of the entered laser light LB is equal to or less than the predetermined light amount. Further, it is also assumed that the terminal end portion 47 of the damping structure 40 is closed.

The present disclosure is not limited to each of the above embodiments, and can be realized by various configurations without departing from the spirit thereof. For example, the technical features in each embodiment corresponding to the technical features in each aspect described in the column of SUMMARY OF THE INVENTION can be appropriately replaced or combined in order to solve some or all of the above-mentioned issues or achieve some or all of the above-described effects. Further, when the technical features are not described as essential in the present specification, these can be deleted as appropriate.

What is claimed is:

1. A laser processing device including a function of evaluating quality of laser processing, the laser processing device comprising:

an oscillator that oscillates laser light;

a mirror disposed in an optical path of the laser light, in which second laser light that is another part of the laser light is reflected by the mirror while first laser light that is a part of the laser light emitted from the oscillator is transmitted through the mirror to irradiate a processing target portion with the second laser light, and first reflected light that is a part of reflected light in which the second laser light with which the processing target portion is irradiated is reflected by the processing target portion is transmitted through the mirror;

a damping structure that receives the first laser light and absorbs the first laser light until an amount of the first laser light becomes equal to or less than a predetermined light amount, wherein the damping structure includes a tubular member on which the first laser light is incident and that includes an inner surface to which black anodized treatment is applied, the tubular member including one end that is closed;

a sensor that measures intensity of the first reflected light transmitted through the mirror; and a processor that outputs an evaluation result representing the quality of the laser processing at the processing target portion based on a measurement result of the intensity of the first reflected light measured by the sensor.

2. An evaluation method for evaluating quality of laser processing of a laser processing device, the laser processing device comprising:

an oscillator that oscillates laser light;

a mirror disposed in an optical path of the laser light, in which second laser light that is another part of the laser light is reflected by the mirror while first laser light that is a part of the laser light emitted from the oscillator is transmitted through the mirror to irradiate a processing target portion with the second laser light, and first reflected light that is a part of reflected light in which the second laser light with which the processing target portion is irradiated is reflected by the processing target portion is transmitted through the mirror;

a damping structure that receives the first laser light and absorbs the first laser light until an amount of the first laser light becomes equal to or less than a predetermined light amount, wherein the damping structure includes a tubular member on which the first laser light is incident and that includes an inner surface to which black anodized treatment is applied, the tubular member including one end that is closed;

a sensor that measures intensity of the first reflected light transmitted through the mirror, and a processor that outputs an evaluation result representing the quality of the laser processing at the processing target portion based on a measurement result of the intensity of the first reflected light measured by the sensor, wherein the evaluation method causes the processor to execute a step of receiving the measurement result of the intensity of the first reflected light measured by the sensor, a step of evaluating the quality of the laser processing at the processing target portion based on the measurement result, and a step of outputting the evaluation result representing the quality.

* * * * *